US008393658B2

(12) United States Patent
Malina et al.

(10) Patent No.: US 8,393,658 B2
(45) Date of Patent: Mar. 12, 2013

(54) DEVICE FOR PROTECTING DOORS

(76) Inventors: Ronnie Malina, Nanuet, NY (US); Eric Malina, Nanuet, NY (US)

(*) Notice: Subject to any disclaimer, the term of this patent is extended or adjusted under 35 U.S.C. 154(b) by 0 days.

(21) Appl. No.: 12/850,042

(22) Filed: Aug. 4, 2010

(65) Prior Publication Data
US 2012/0032462 A1 Feb. 9, 2012

(51) Int. Cl.
*B60R 19/42* (2006.01)
(52) U.S. Cl. ...................................................... 293/128
(58) Field of Classification Search .................. 293/128, 293/117, 136, 108, 124, 126; 280/743.1, 280/730.2, 743.2
See application file for complete search history.

(56) References Cited

U.S. PATENT DOCUMENTS

| | | | | | |
|---|---|---|---|---|---|
| 1,319,299 | A | * | 10/1919 | Meehan ........................ | 128/888 |
| 2,212,493 | A | * | 8/1940 | Brunken ....................... | 293/128 |
| 2,367,690 | A | * | 1/1945 | Purdy ........................... | 128/888 |
| 2,675,983 | A | * | 4/1954 | King ........................... | 248/475.1 |
| 2,734,765 | A | * | 2/1956 | Henderson et al. ........... | 293/128 |
| 3,610,669 | A | * | 10/1971 | Morrissey, Sr. .............. | 293/128 |
| 3,687,502 | A | * | 8/1972 | Loew ............................ | 293/128 |
| 3,704,037 | A | * | 11/1972 | Glassberg ..................... | 293/128 |
| 3,718,945 | A | * | 3/1973 | Brindejonc de Treglode . | 24/370 |
| 3,738,695 | A | * | 6/1973 | McBee ......................... | 293/128 |
| 4,002,363 | A | * | 1/1977 | James ........................... | 293/128 |
| 4,127,294 | A | * | 11/1978 | Cooper ......................... | 293/120 |
| 4,629,232 | A | * | 12/1986 | Zimlich et al. ................ | 293/128 |
| 4,643,471 | A | * | 2/1987 | Fishback ....................... | 293/128 |
| 4,674,783 | A | * | 6/1987 | Hogan, III .................... | 293/128 |
| 4,690,446 | A | * | 9/1987 | Warren ......................... | 293/128 |
| 4,707,009 | A | * | 11/1987 | Barnett ......................... | 293/128 |
| 4,708,380 | A | * | 11/1987 | Cruz ............................. | 293/128 |
| 4,726,614 | A | * | 2/1988 | Myers et al. .................. | 293/128 |
| 4,750,767 | A | * | 6/1988 | Barnett ......................... | 293/128 |
| 4,796,935 | A | * | 1/1989 | Maraia ......................... | 293/128 |
| D299,819 | S | * | 2/1989 | Katz et al. .................... | D12/167 |
| 4,808,450 | A | * | 2/1989 | Guy .............................. | 428/31 |
| 4,810,013 | A | * | 3/1989 | Spears .......................... | 293/128 |
| 4,810,015 | A | * | 3/1989 | McNeil ......................... | 293/128 |
| 4,828,302 | A | * | 5/1989 | Marasigan, Jr. .............. | 293/128 |
| 4,828,303 | A | * | 5/1989 | Soria ............................ | 293/128 |
| D301,861 | S | * | 6/1989 | Muschette .................... | D12/167 |
| 4,879,543 | A | * | 11/1989 | Smith, Sr. .................... | 340/473 |
| D308,504 | S | * | 6/1990 | Hensley ....................... | D12/167 |
| D312,237 | S | * | 11/1990 | Avery .......................... | D12/190 |
| 4,993,765 | A | * | 2/1991 | Ryan ............................ | 293/127 |
| 5,037,148 | A | * | 8/1991 | Kennedy ...................... | 293/128 |
| 5,050,308 | A | * | 9/1991 | Walsh ........................... | 33/430 |
| 5,060,994 | A | * | 10/1991 | Martin et al. ................. | 293/128 |
| 5,071,181 | A | * | 12/1991 | Wagner ........................ | 293/128 |
| 5,072,979 | A | * | 12/1991 | Swinton ....................... | 293/128 |
| 5,149,166 | A | * | 9/1992 | Wille et al. ................... | 293/128 |
| 5,156,425 | A | * | 10/1992 | Wagner ........................ | 293/128 |
| 5,162,139 | A | * | 11/1992 | Gomez et al. ................ | 428/31 |
| D338,647 | S | * | 8/1993 | Bailey .......................... | D12/167 |
| 5,320,392 | A | * | 6/1994 | Hart ............................. | 293/128 |
| 5,956,918 | A | * | 9/1999 | Wise ............................ | 52/716.5 |
| 5,975,599 | A | * | 11/1999 | Goldstein ..................... | 293/128 |

(Continued)

*Primary Examiner* — Kiran B Patel
(74) *Attorney, Agent, or Firm* — Jeffrey Sonnabend; SonnabendLaw

(57) ABSTRACT

A protecting device for a vehicle is disclosed. The protection device has an elongated member having a longitudinal axis, a plurality of generally flat profiles along one side of the member, at least one magnet positioned in at least one of the generally flat profiles, and an extendible tether attached to the member. At least one concavity extends between the generally flat profiles along the longitudinal axis.

9 Claims, 5 Drawing Sheets

U.S. PATENT DOCUMENTS

| | | | |
|---|---|---|---|
| 6,186,564 B1 * | 2/2001 | Ashcroft | 293/128 |
| 6,247,734 B1 * | 6/2001 | Hamilton et al. | 293/128 |
| 6,736,435 B1 * | 5/2004 | Ditthavong | 293/128 |
| D490,754 S * | 6/2004 | Harris | D12/167 |
| 6,769,725 B2 * | 8/2004 | Ko | 293/128 |
| D511,736 S * | 11/2005 | Davie | D12/401 |
| 7,229,108 B2 * | 6/2007 | Hochrein | 293/128 |
| 2005/0099026 A1 * | 5/2005 | Velazquez | 293/128 |

* cited by examiner

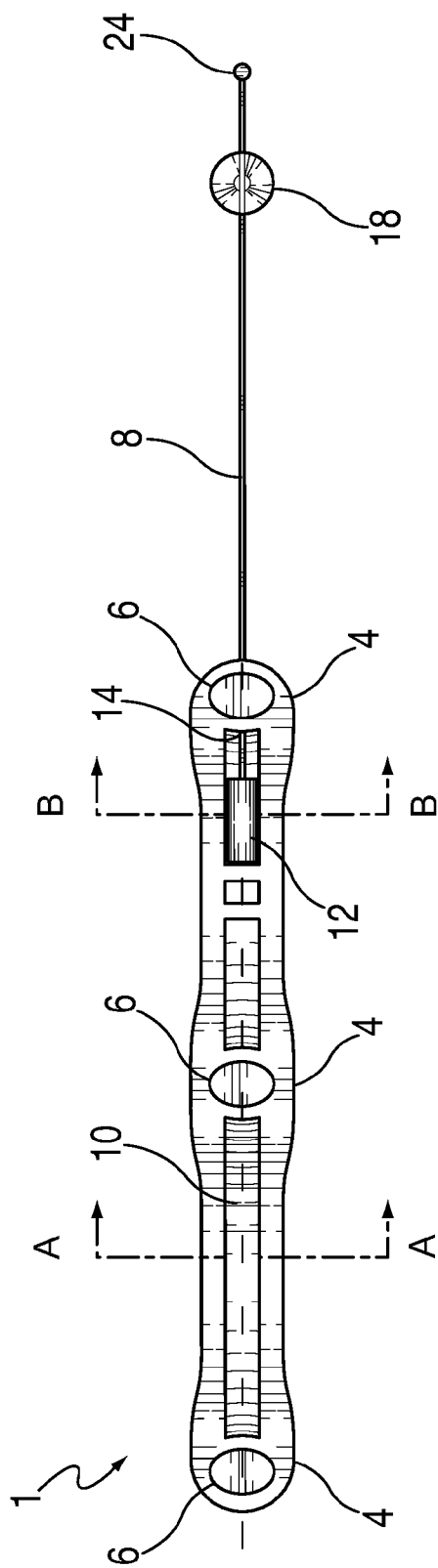
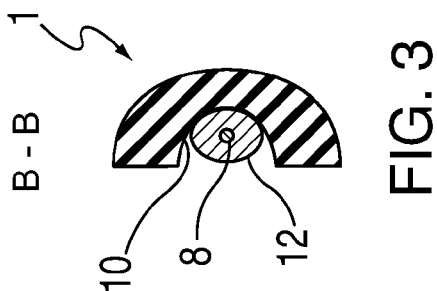

DEVICE FOR PROTECTING DOORS

BACKGROUND OF THE INVENTION

1. Field of the Invention

The present invention generally relates to a device for protecting a metal surface from impact. Specifically, this device may be used for protecting the doors of a vehicle. In particular, this device may be configured for protecting either two-door or four-door cars.

2. Description of the Related Art

The sides of cars have long been subject to unwarranted impacts resulting in the denting of their surfaces. This particularly occurs, when cars are parked, the owner is nowhere in sight, and a car door from a car parked too close, hits and dents the surface thereof. All kinds of permanent trim and impact resistant materials have been used, with limited success. Detachable elements have also been used, although these are either difficult to attach properly or difficult to detach, once attached. There is therefore a great need in the art for a device that may be easily attached to prevent and protect the sides of parked cars and subsequently, easily detached.

Accordingly, there is now provided with this invention an improved protection device effectively overcoming the aforementioned difficulties and longstanding problems inherent in protecting the sides of parked cars. These problems have been solved in a simple, convenient, and highly effective way by which to easily attach an easily detachable protection device on a vehicle. More particularly, further features are provided.

SUMMARY OF THE INVENTION

According to one aspect of the invention, the protection device has an elongated member having a longitudinal axis, a plurality of generally flat profiles along one side of the member, at least one magnet positioned in at least one of the generally flat profiles, and an extendible tether attached to the member. At least one concavity extends between the generally flat profiles along the longitudinal axis.

As will be appreciated by those persons skilled in the art, a major advantage provided by the present invention is to have an easily attachable and easily detachable protection device for vehicles. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein:

FIG. 1 is a bottom view of an embodiment of the invention.

FIG. 2 is a cross-sectional view along axis A-A of FIG. 1.

FIG. 3 is a cross-sectional view along axis B-B of FIG. 1.

DESCRIPTION OF THE PREFERRED EMBODIMENT

Figure 4:
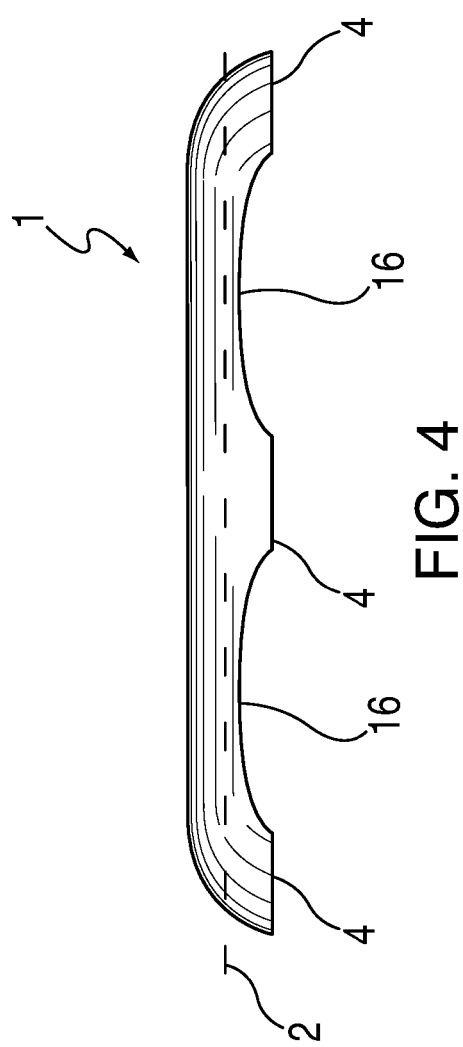
FIG. 4 is a side view of the embodiment of FIG. 1.

The following preferred embodiment as exemplified by the drawings is illustrative of the invention and is not intended to limit the invention as encompassed by the claims of this application. An apparatus and method for protecting doors of a vehicle is disclosed herein.

The protection device 1, as illustrated in FIG. 1, is shown from the bottom side of the protection device. This is the side that is to be attached to the area of the vehicle to which protection is desired. The device is preferably formed of an elastomeric material having a great ability to absorb the shock of an impact, for example, ethylene vinyl acetate foam. Such an elastomeric material may be a rubber or the like, having a shore durometer measurement in the range of from about 15 to about 75.

The device is generally elongated along a longitudinal axis 2. Along the longitudinal axis 2 there is at least one generally flat profile 4 in the cross section of the longitudinal axis. As shown in the embodiment depicted in FIG. 1, there are three flat profiles 4, although any number may be used. Positioned in the plane of the generally flat profile 4 is a magnet 6. Although the embodiment shown in FIG. 1 has a magnet in each of the flat profiles, this is not necessary, so long as at least one of the flat profiles has a magnet therein. Preferably, the magnet generates a strong magnetic field for strong attachment to the surface to be protected. For example, a rare earth magnet may be used for this purpose.

Furthermore, magnet 6 is preferably covered by or encased in a non-scratching material which may also have a high coefficient of static friction (i.e., is "grippy"). In this manner, the device will prevent the magnet from scratching a vehicle to which it is attached and will assist in maintaining the desired location of the device by minimizing or eliminating the tendency of the device to slip. The material may be, for example, rubber, silicone, or other elastomeric material.

Extending from an end of the device is a tether 8. The tether 8 is preferably a hardened steel cable. Further, the tether is preferably relatively flexible and not rigid. Accordingly, the tether may be a woven steel cable that is encased in a water resistant material.

As shown in the cross-section A-A of FIG. 1 and specifically in FIG. 2, a hollow 10 extends between the flat profiles 4. Providing hollow 10 affords greater resiliency and cushioning between the surface to be protected and any unwanted impact.

The tether 8 is attached to an end of the protection device and extends into a sleeve 12. The sleeve 12 is positioned in one of the hollows 10. The sleeve 12 has an aperture 14 at one end. Aperture 14 is essentially a constriction in the sleeve 12. The portion of the tether within the sleeve 12 has an end that cannot pull through this constriction. The end of the tether may have, for example, a bulbuous end having a larger diameter than the diameter of the aperture. In this way, the constriction 14 of the sleeve 12 securely holds the end of the tether 8 therein while still allowing that end to travel the length of the sleeve.

FIG. 4 is a side view of an embodiment of the device 1. It is a view that is rotated 90° from FIG. 1 about axis 2. In this view, a concavity 16 is shown between the generally flat profiles. Providing such concavities 16 allows a user to grab the device while it is attached to a surface for more easy detachment than was previously achieved. Concavities 16 also increase the impact absorption capabilities of the device.

Figure 5:
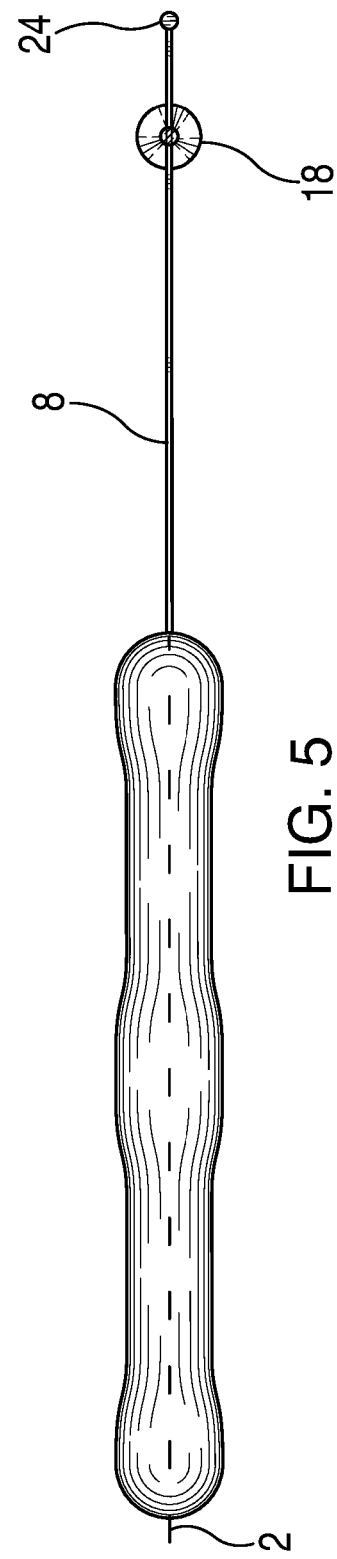
FIG. 5 is a top view of the embodiment of FIG. 1.

FIG. 5 is a top view of the device. It is a view that is rotated 90° from FIG. 4 about axis 2 and is the side that directly receives any unwanted impact. As shown in FIG. 5, the device has rounded ends and a generally continuous surface provided for protection.

Figure 6:
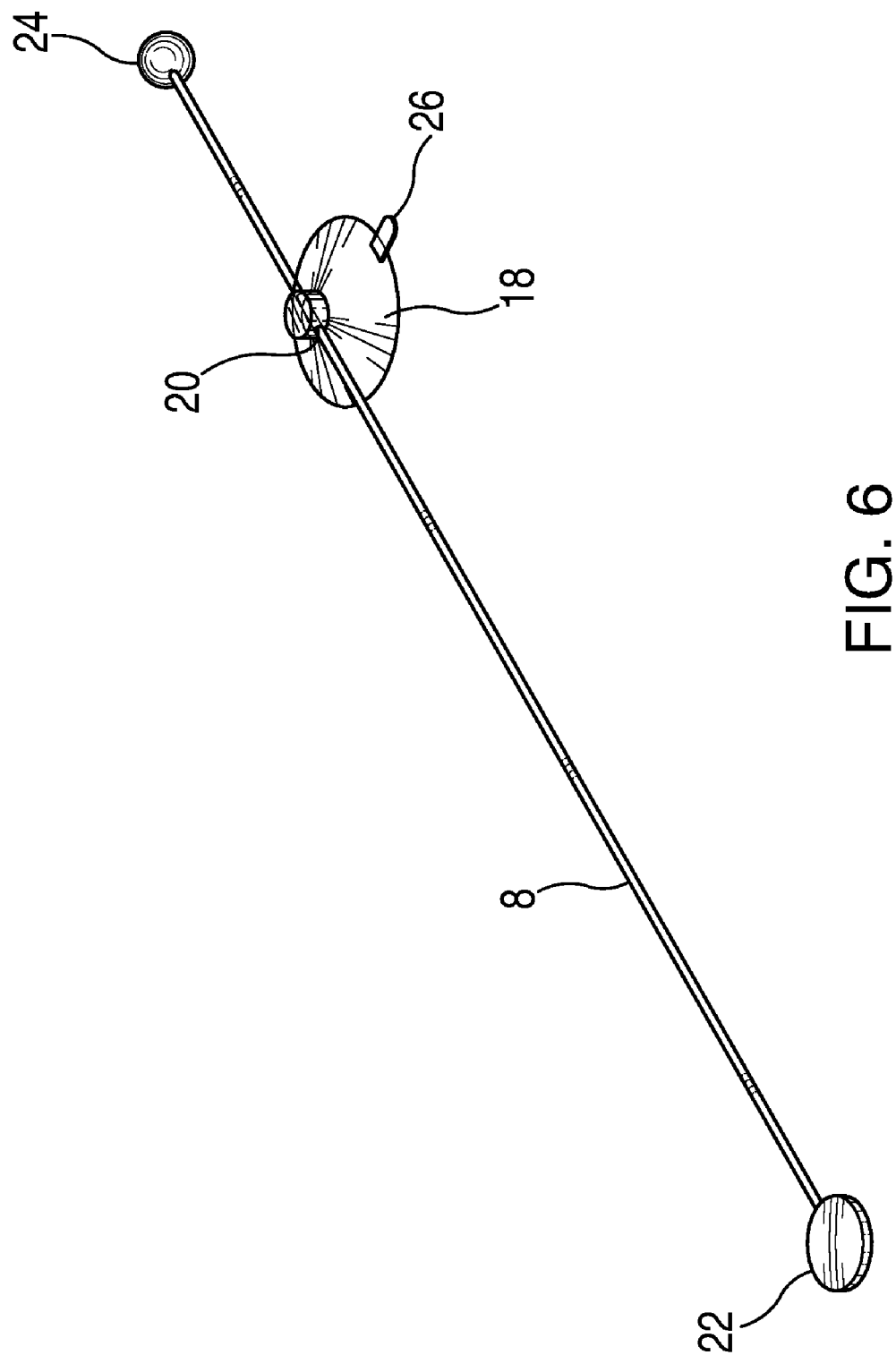
FIG. 6 is an orthogonal view of an embodiment of the tether.

The tether 8 is shown in FIGS. 1 and 5, and more particularly in FIG. 6, shown apart from the device. The tether 8 has a suction cup 18 attached thereto. The suction cup 18 has a hole 20 through which the tether is threaded. At both ends of the tether are embodiments of extending prevention devices 22 and 24. For example, extending prevention device 22 keeps the tether within its sleeve. Extending prevention devices 24 keeps the suction cup attached to the tether. The suction cup may include a tab 26 to grab for easy removal.

Figure 7:
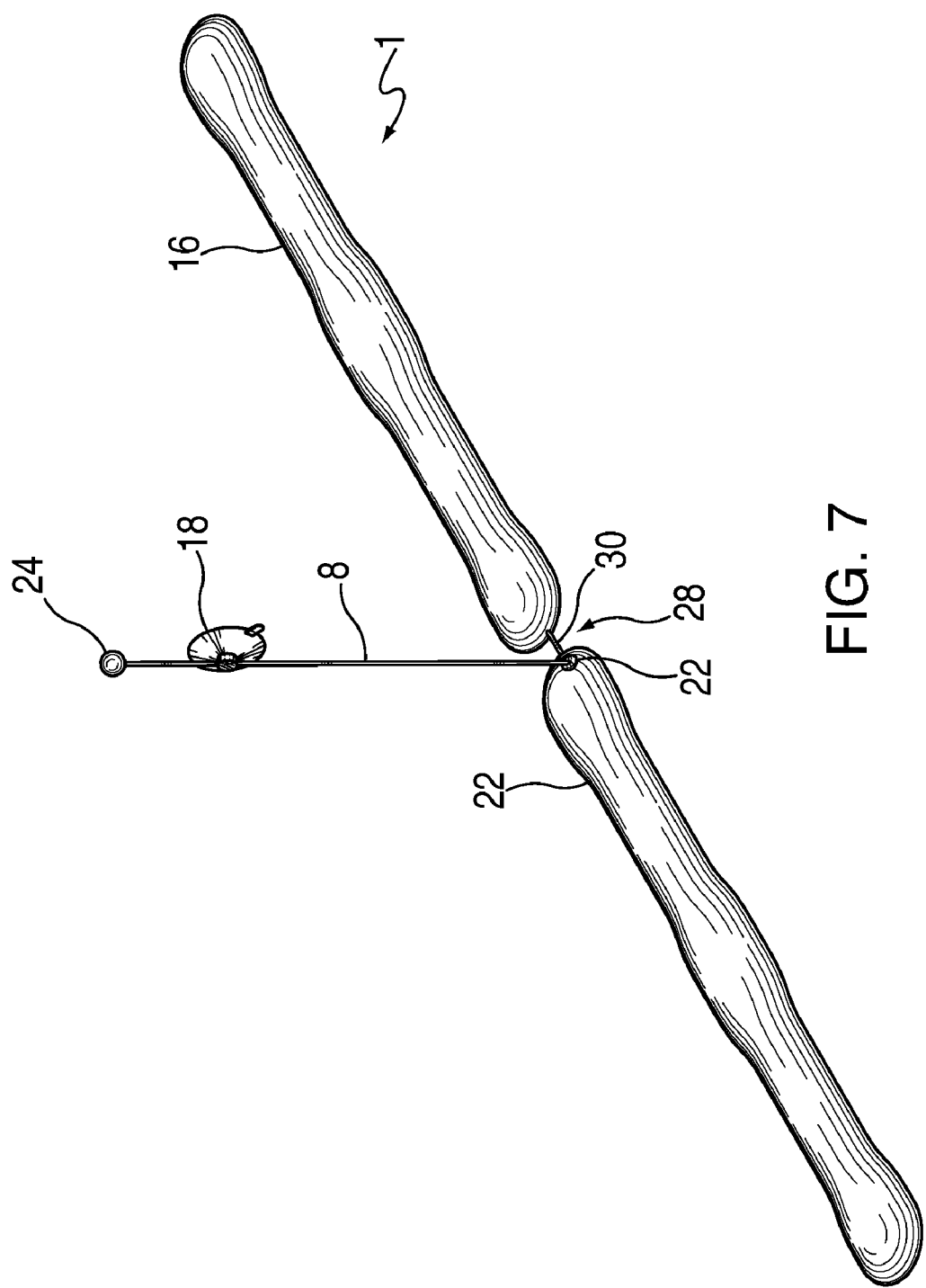
FIG. 7 is a top view of another embodiment of the invention.

FIG. 7 shows an embodiment of the device that includes a pair of substantially identical devices attached to one another by a connection assembly 28. The connection assembly 28 is preferably a hardened steel cable. Further, the connection assembly is preferably relatively flexible and not rigid. Accordingly, the connection assembly may be a woven steel cable that is encased in a water resistant material.

Figure 8:
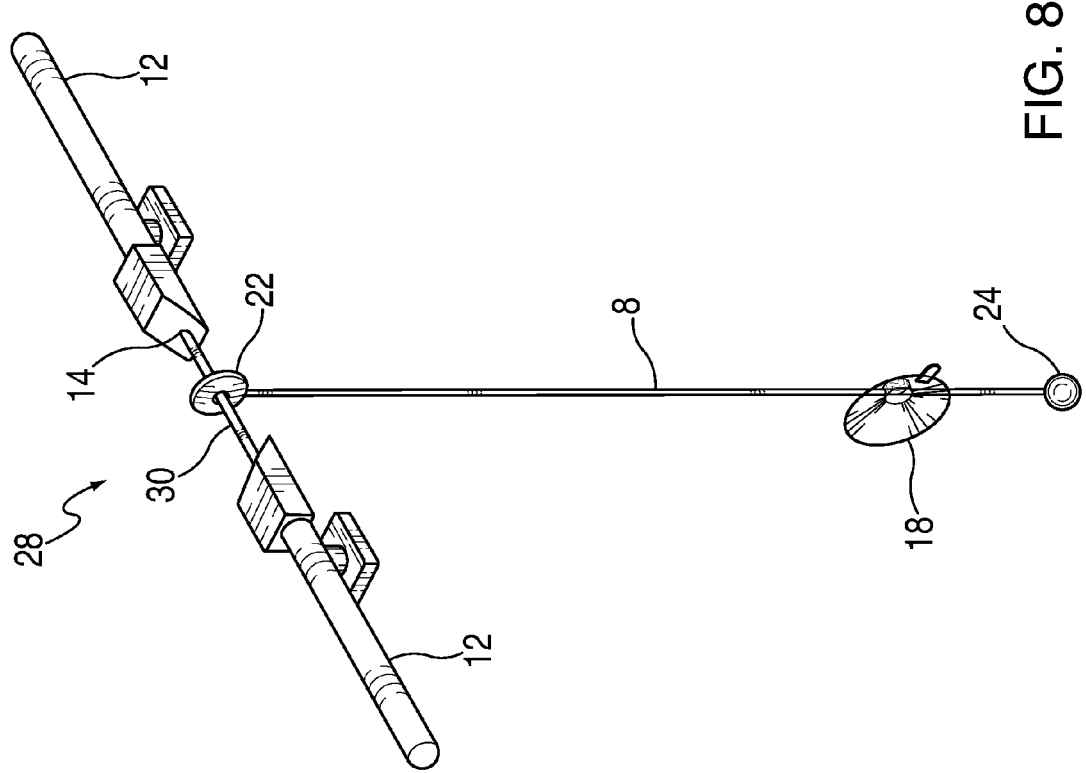
FIG. 8 is a detailed view of the connection between two embodiments of the invention.

The connection assembly is specifically illustrated in FIG. 8 apart from the pair of protection devices. Each of the pair of protection devices 1 would have a sleeve 12 therein. The connection assembly has a cable 30 extending between the sleeves together with a tether 8. The cable 30 is secured within both sleeves by having extending prevention ends that cannot be pulled through the apertures 14 of the sleeves. The pair of protection devices still may be pulled apart from one another and move toward one another to the extent that the ends of the cable 30 travel within their respective sleeves. As shown, the cable 30 is threaded through the end 22 of the tether, although any permanent attachment of the tether 8 to the cable 30 may be used.

In use, when a vehicle is parked, and a surface of which is decided to be protected from an impact, the device is secured to the surface by the magnets. The tether is then extended up and around the window of the vehicle so that the suction cup attaches on the inside of the window of the vehicle. When the door of the vehicle is then locked, the tether is secured in the vehicle thus preventing theft of the protection device. When the protection device is to be subsequently removed, one can fit the fingers of one's hand in the concavities 16, to easily overcome the magnetic attraction between the protection device and the side of the vehicle. One then pulls the suction cup by its tab 26 from the window of the vehicle.

Although the particular embodiments shown and described above will prove to be useful in many applications in the art of protection devices for vehicles, to which the present invention pertains, further modifications of the present invention will occur to persons skilled in the art. All such modifications are deemed to be within the scope and spirit of the present invention as defined by the appended claims.

What is claimed is:

1. A protecting device comprising a pair of elongated members, wherein each member has a longitudinal axis, a plurality of generally flat profiles along one side of the member, at least one magnet positioned in the plane of at least one of the generally flat profiles, at least one concavity extending substantially between the generally flat profiles along the longitudinal axis, and a cable connecting the pair of elongated members, wherein the cable has a tether attached thereto and the tether has a suction cup slidable along the tether.

2. The protecting device of claim 1, wherein the ends of the members have a generally curved profile.

3. The protecting device of claim 1, wherein the magnet is covered by an elastomeric material.

4. The protecting device of claim 1, further including a hollow extending between the generally flat profiles.

5. The protecting device of claim 1, further including a stop at one end of the tether for preventing the tether from pulling through the suction cup.

6. The protecting device of claim 1, wherein the magnet is a rare earth magnet.

7. The protecting device of claim 1, wherein the device is made of an ethylene vinyl acetate foam.

8. The protecting device of claim 1, wherein the device has a Shore durometer in the range of from about 15 to about 75.

9. The protecting device of claim 1, wherein the concavity provides an air gap between the protecting device and an article to which the magnet can attach.

\* \* \* \* \*